(12) United States Patent
Lenz (10) Patent No.: US 12,356,969 B2
(45) Date of Patent: Jul. 15, 2025

(54) FISHING NET SUPPORT SYSTEM

(71) Applicant: Matthew James Lenz, Brooklyn Park, MN (US)

(72) Inventor: Matthew James Lenz, Brooklyn Park, MN (US)

(*) Notice: Subject to any disclaimer, the term of this patent is extended or adjusted under 35 U.S.C. 154(b) by 49 days.

(21) Appl. No.: 18/383,625

(22) Filed: Oct. 25, 2023

(65) Prior Publication Data

US 2024/0138386 A1     May 2, 2024

Related U.S. Application Data (60) Provisional application No. 63/421,125, filed on Oct. 31, 2022.

(51) Int. Cl.
*A01K 75/00*     (2006.01)

(52) U.S. Cl.
CPC .................................. *A01K 75/00* (2013.01)

(58) Field of Classification Search
CPC ......... A01K 75/00; A01K 97/10; A01K 87/00
USPC ................. 248/214, 227.4, 222.13, 224.61
See application file for complete search history.

(56) References Cited

U.S. PATENT DOCUMENTS

| | | | | |
|---|---|---|---|---|
| 2,834,138 | A | * | 5/1958 | Pedersen ................ A01K 77/00 43/55 |
| 5,099,597 | A | * | 3/1992 | Whistle .................. A01K 77/00 440/109 |
| 5,975,479 | A | * | 11/1999 | Suter ...................... A01K 97/10 43/21.2 |
| 2012/0187064 | A1 | * | 7/2012 | Miller .................... A01K 97/10 211/124 |
| 2022/0087235 | A1 | * | 3/2022 | Lenz ...................... A01K 77/00 |
| 2023/0382483 | A1 | * | 11/2023 | MacIntosh ............. A01K 97/10 |
| 2024/0057578 | A1 | * | 2/2024 | Zieske ................... B65D 25/04 |
| 2024/0138386 | A1 | * | 5/2024 | Lenz ...................... A01K 75/00 |
| 2024/0172734 | A1 | * | 5/2024 | Staines .................. A01K 97/10 |

* cited by examiner

*Primary Examiner* — Muhammad Ijaz (57) ABSTRACT

A fishing net support assembly for releasably securing a pole of a fishing net to a boat includes a boat mount and a pole mount, which are configured to be mounted onto a hull of the boat and to a pole of a fishing net, respectively. A first mating member and a second mating member are attached to the boat mount and to the pole mount, respectively. Upon mating of the second mating member to the first mating member, the pole is positioned in a horizontal plane and a receiving net of the fishing net and a catch within the receiving net are positioned in the water and are rotatable within the horizontal plane.

14 Claims, 8 Drawing Sheets

FISHING NET SUPPORT SYSTEM

CROSS-REFERENCE TO RELATED APPLICATIONS

I hereby claim the benefit under 35 U.S.C. Section 119(e) of United States Provisional application 63/421,125 filed on Oct. 31, 2022.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pole gripping devices and more particularly pertains to a new pole gripping device allowing for releasably securing a pole of a fishing net to a boat so that the pole is rotatable within a horizontal plane while maintaining a receiving net of the fishing net and a catch within the receiving net in the water.

(2) Description of Related Art Including Information Disclosed Under 37 CFR 1.97 and 1.98

The prior art relates to pole gripping devices that are used to attach a fishing net pole to a boat but which include securing means that do not allow one to rotate a receiving net and a catch horizontally relative to the boat.

BRIEF SUMMARY OF THE INVENTION

An embodiment of the disclosure meets the needs presented above by generally comprising a boat mount and a pole mount, which are configured to be mounted onto a hull of a boat and to a pole of a fishing net, respectively. A first mating member and a second mating member are attached to the boat mount and to the pole mount, respectively. Upon mating of the second mating member to the first mating member, the pole is rotatable about the first mating member in a horizontal plane while maintaining a receiving net of the fishing net and a catch in the receiving net in the water.

Another embodiment of the disclosure includes a fishing net support system, which comprises a boat having a hull, a fishing net, and a fishing net support assembly, according to the disclosure above. An upper edge of the hull defines a gunwale. A boat mount and a pole mount of the fishing net support assembly are mounted onto the gunwale and to a pole of the fishing net, respectively. First and second mating members are attached to the boat and pole mounts, respectively. The second mating member has been mated to the first mating member so that the pole is rotatable about the first mating member in a horizontal plane while maintaining a receiving net of the fishing net and a catch in the receiving net in the water.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new pole gripping device embodying the principles and concepts of an embodiment of the disclosure and generally designated by the reference numeral 10 will be described.

Figure 4:
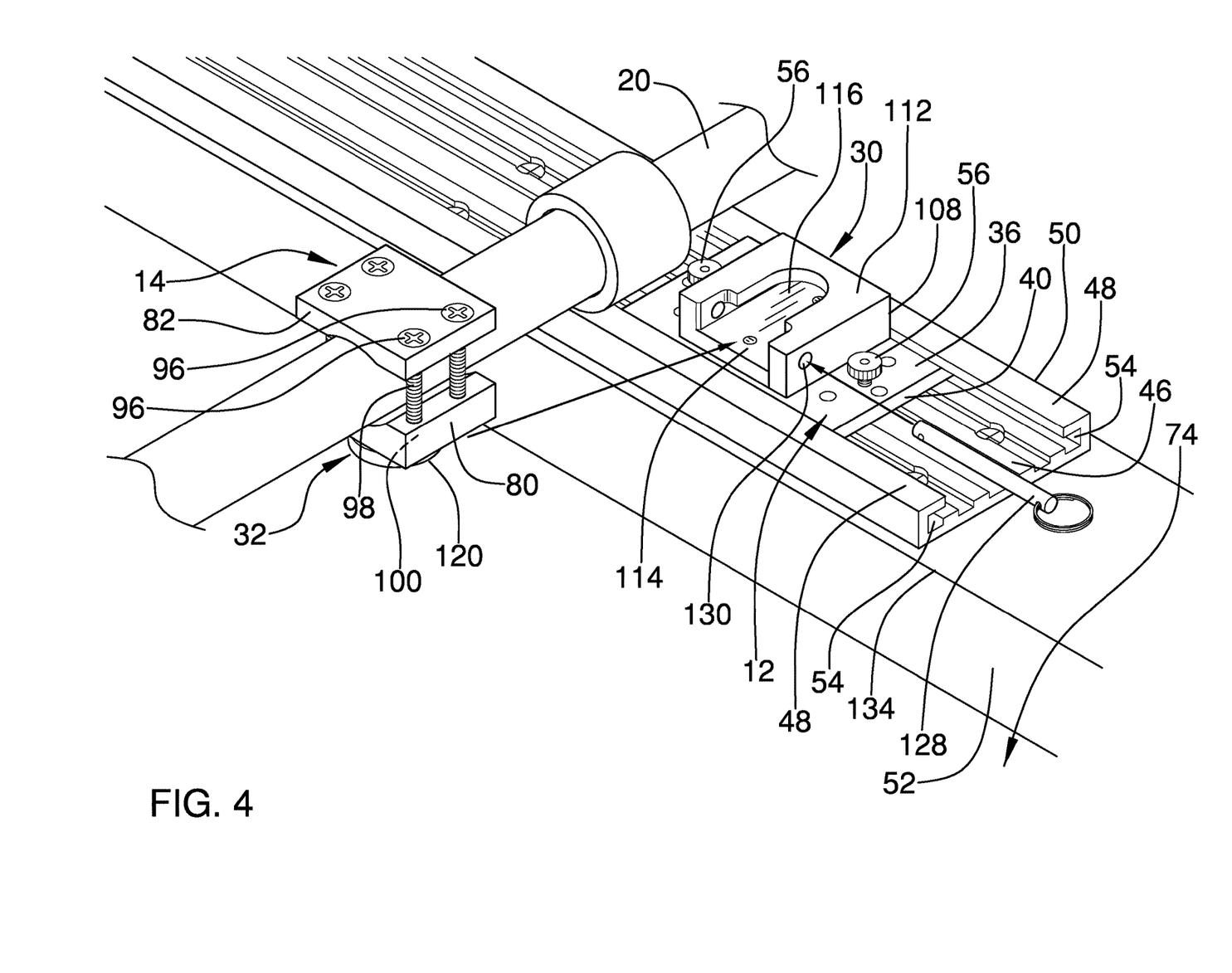
FIG. 4 is an in-use view of an embodiment of the disclosure.

As best illustrated in FIGS. 1 through 8, the fishing net support assembly 10 generally comprises a boat mount 12 and a pole mount 14, which are configured to be mounted onto a hull 16 of a boat 18 and to a pole 20 of a fishing net 22, respectively, as is shown in FIG. 4. The boat 18 is not limited to any particular type of watercraft and may include, for example, canoes, kayaks, and other fishing boats used by persons typically fishing with a rod and reel combination. The fishing net 22 is a conventional fishing net 22 used while fishing from a boat 18 and includes a pole 20 having a loop 24 attached to one end 26 of the pole 20 and, typically, a grip (not shown) attached to the other end (not shown). A receiving net 28 is attached to and extends along the loop 24.

A first mating member 30 and a second mating member 32 are attached to the boat mount 12 and to the pole mount 14, respectively. Upon mating of the second mating member 32 to the first mating member 30, the pole 20 is rotatable about the first mating member 30 in a horizontal plane 34, as is demonstrated in FIGS. 5 and 6. As such, a user can secure the fishing net 22 to the hull 16 while maintaining the receiving net 28 and a catch, such as a fish, in the water. This frees up hands of the user to perform other tasks, such as, but not limited to, measuring, weighing, photographing, unhooking, and releasing the catch. As may be required, the pole 20 can be rotated within the horizontal plane 34 to bring the receiving net 28 and the catch closer to the hull 16.

Figure 5:
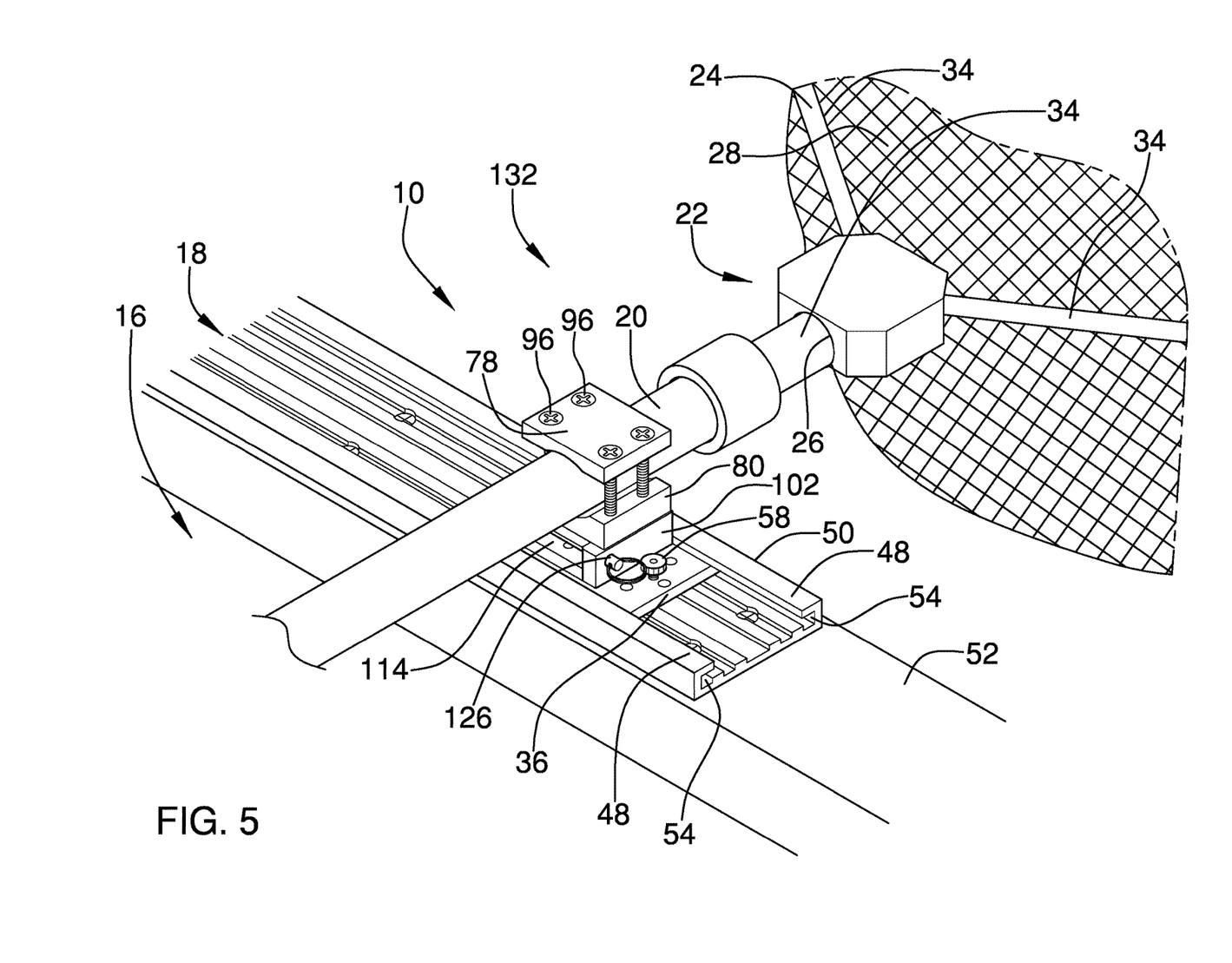
FIG. 5 is an in-use view of an embodiment of the disclosure.
Figure 6:
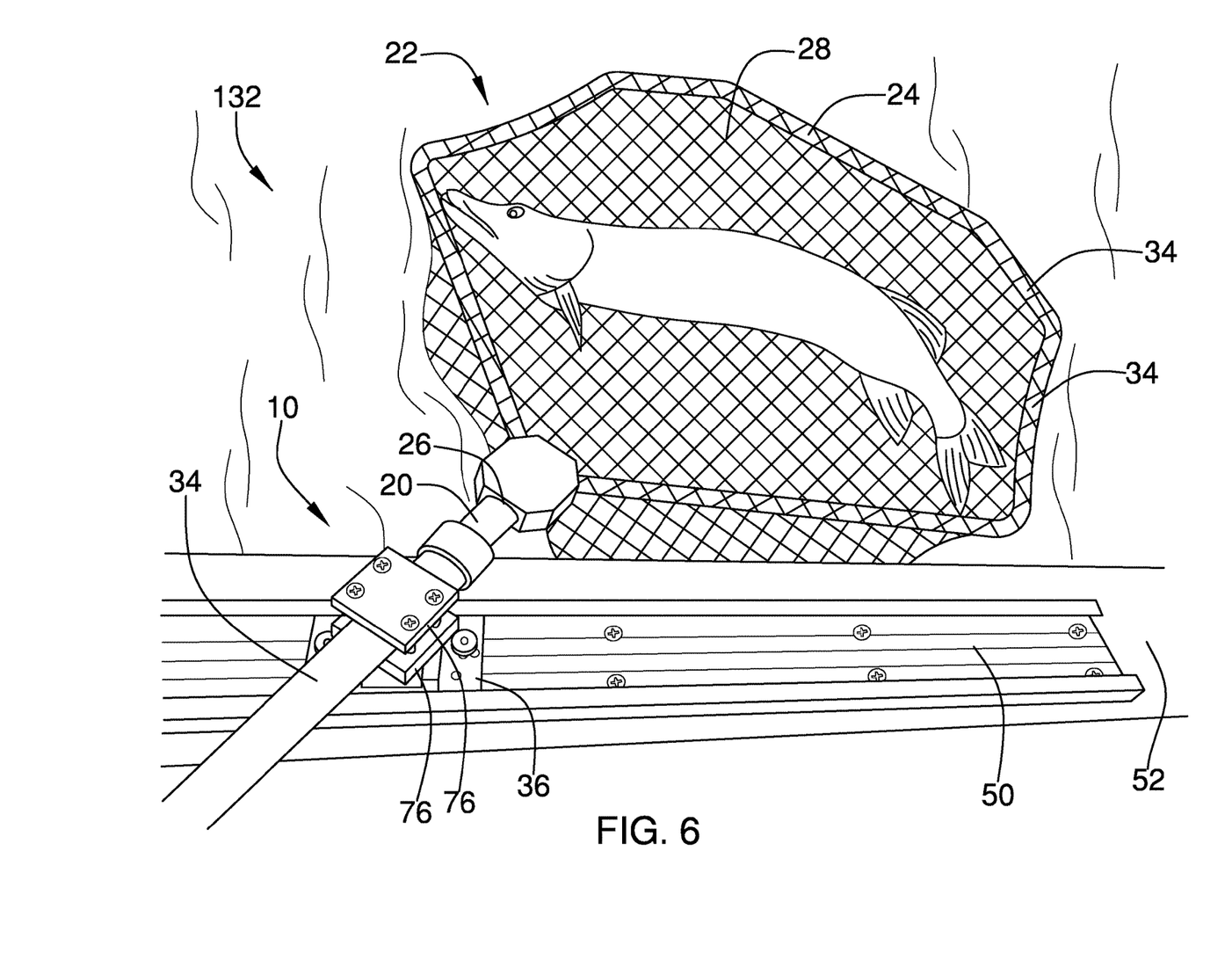
FIG. 6 is an in-use view of an embodiment of the disclosure.

As is shown in FIGS. 1-6, the boat mount 12 may comprise a mounting plate 36, which has a length 38, a width 40, a top side 42, and a bottom side 44. The first mating member 30 is attached to the top side 42. One or both of the length 38 and the width 40 is complementary to a separation 46 between rails 48 of a mounting track 50 that is attached to a gunwale 52 of the hull 16, as is shown in FIGS. 4-6. The mounting track 50 is conventional to fishing boats and is often used to hold fishing poles and fishing accessories while fishing. The mounting track 50 is elongated and allows articles attached thereto to be slid along the mounting track 50 and to be secured where desired without the requirement for a plurality of receiving apertures extending into the hull 16.

As can be seen in FIGS. 4-6, the mounting plate 36 is insertable between the rails 48 so that the mounting plate 36 is slidable within the mounting track 50 with the bottom side 44 facing the mounting track 50. The mounting plate 36 extends into receiving slots 54 that are defined by the rails 48. A plurality of tighteners 56 are extendable through the mounting plate 36 and engage the mounting track 50 to releasably secure the mounting plate 36 at a selected position along the mounting track 50. Each tightener 56 may comprise a thumbscrew 58, as is shown in the figures, or other tightening means, such as, but not limited to, latches, wedges, clips, or the like. The thumbscrews 58 can be rotated to extend downwardly toward and against the mounting track 50 and to lift and bias the mounting plate 36 upwardly against the rails 48 to hold the mounting plate 36 in a selected location. Other types of mounting tracks 50 may include fasteners that either directly engage the mounting track 50 or which include threaded fasteners to secure the mounting plate 36 in position and such configurations are anticipated by the present invention. Regardless, the mounting track 50 may be considered as an integral part of the hull 16 for the certain embodiments of the invention disclosed herein.

Figure 7:
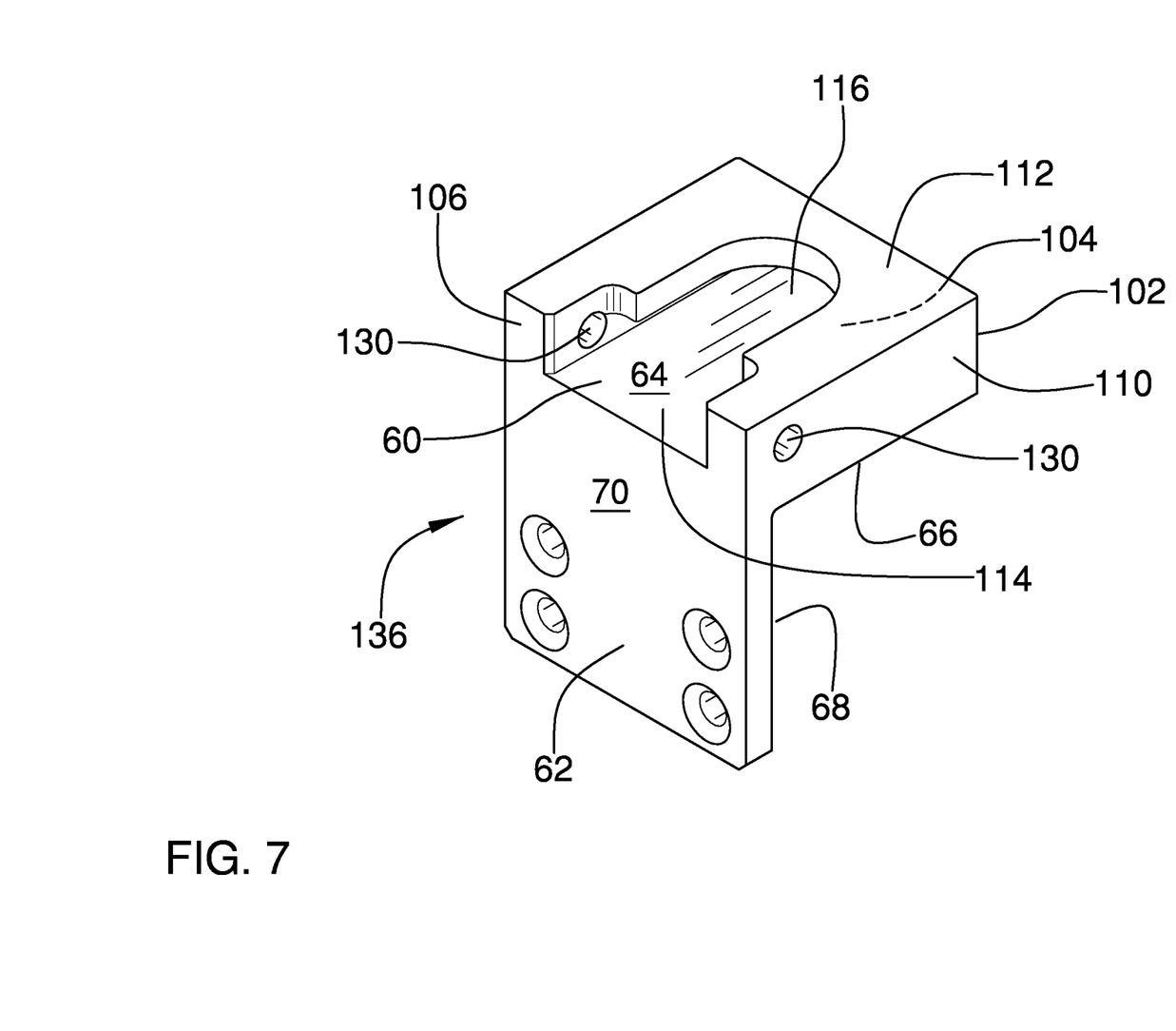
FIG. 7 is an isometric perspective view of an embodiment of the disclosure.
Figure 8:
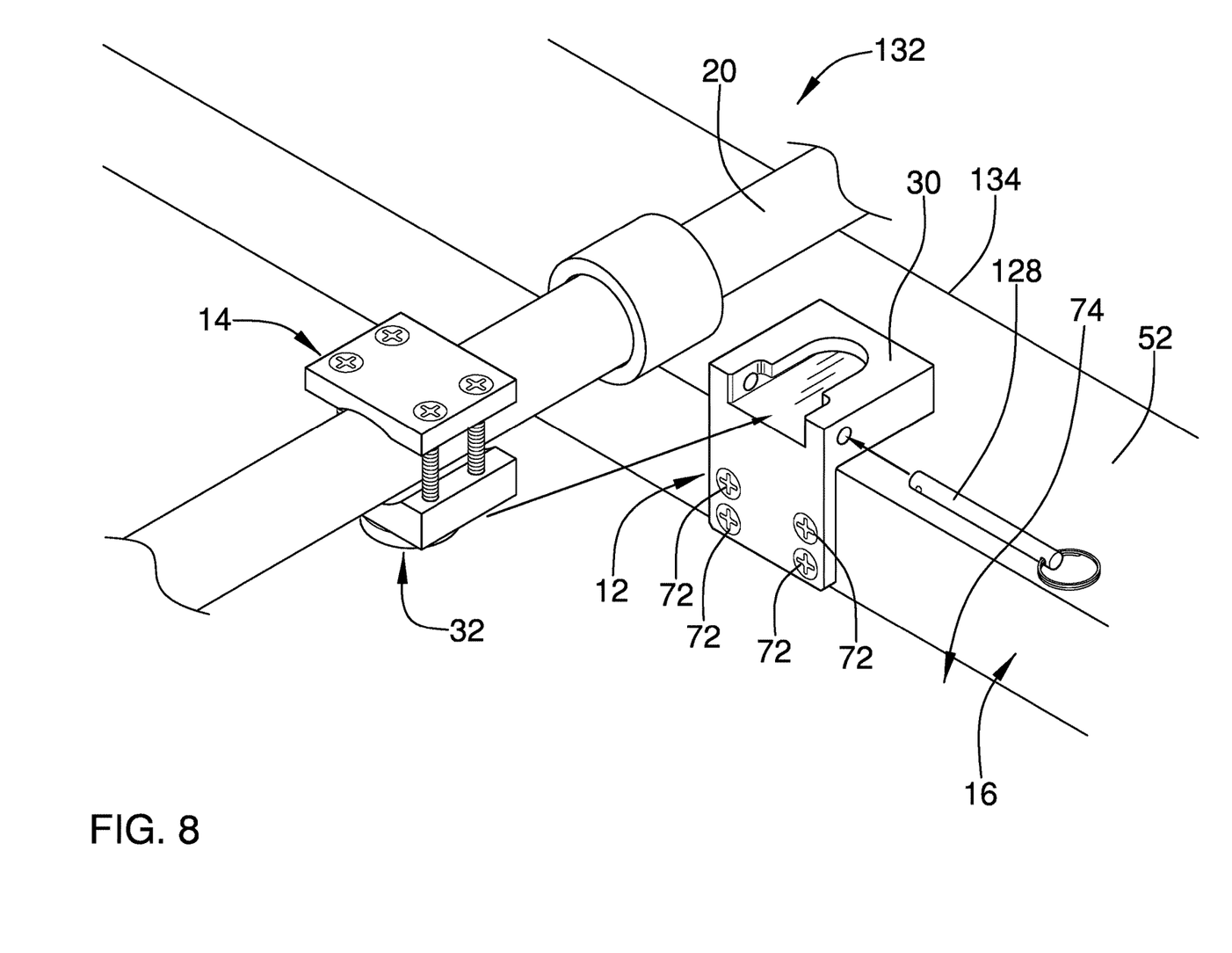
FIG. 8 is an in-use view of an embodiment of the disclosure.

As is shown in FIGS. 7-8, the boat mount 12 comprises a bracket 136 having a horizontal piece 60 and a vertical piece 62. The horizontal piece 60 has an upper face 64 and a lower face 66, with the first mating member 30 being attached to the upper face 64. The vertical piece 62 has an inner face 68 and an outer face 70. A plurality of mounting fasteners 72 are extendable through the vertical piece 62 and engages the hull 16 so that the inner face 68 faces the hull 16. Most typically, the lower face 66 of the horizontal piece 60 is positioned on the gunwale 52 of the boat 18 and the vertical piece 62 is screwed into the hull 16 from an inside 74 of the boat 18, as is shown in FIG. 8.

Figure 1:
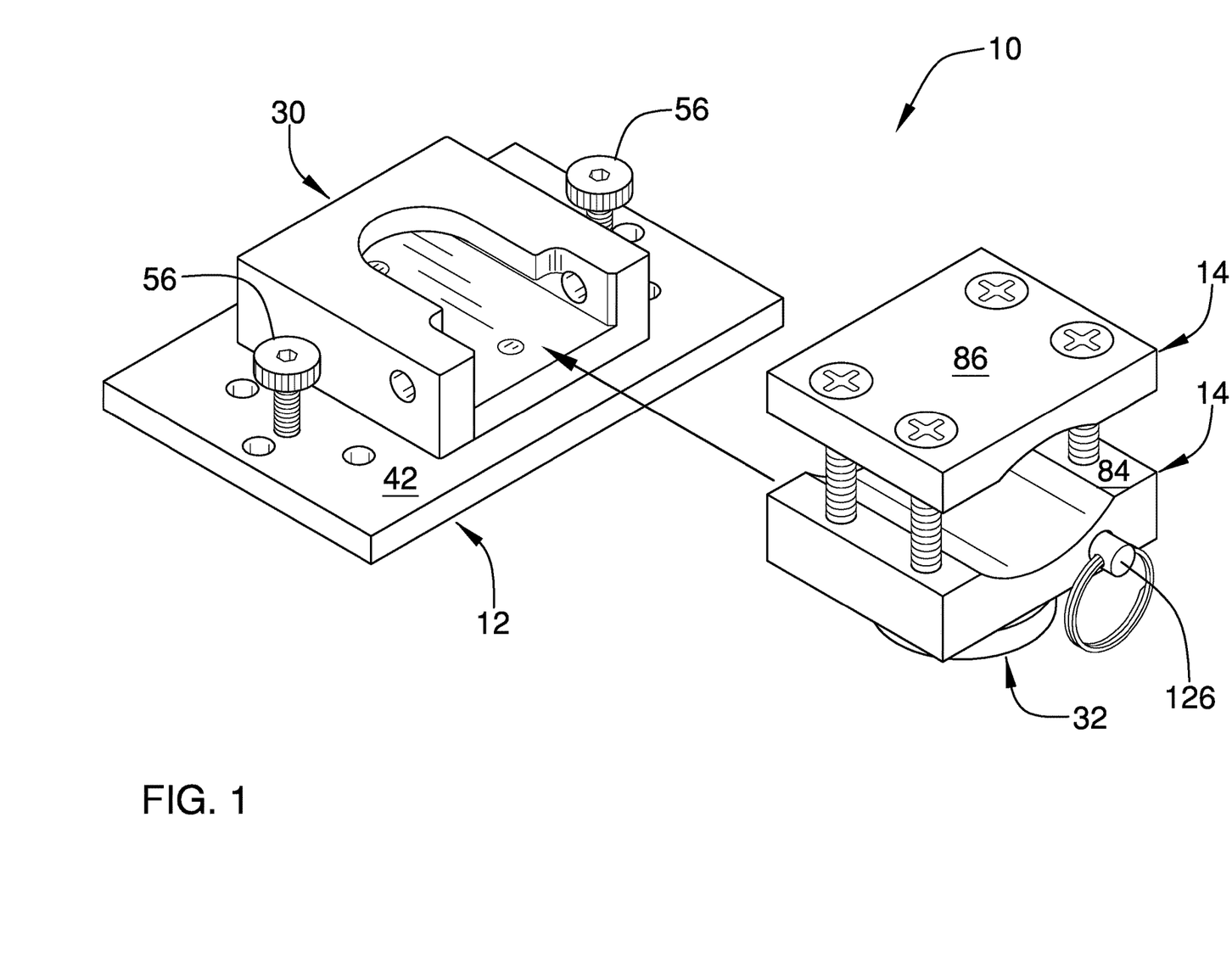
FIG. 1 is a top isometric perspective view of a fishing net support assembly according to an embodiment of the disclosure.
Figure 2:
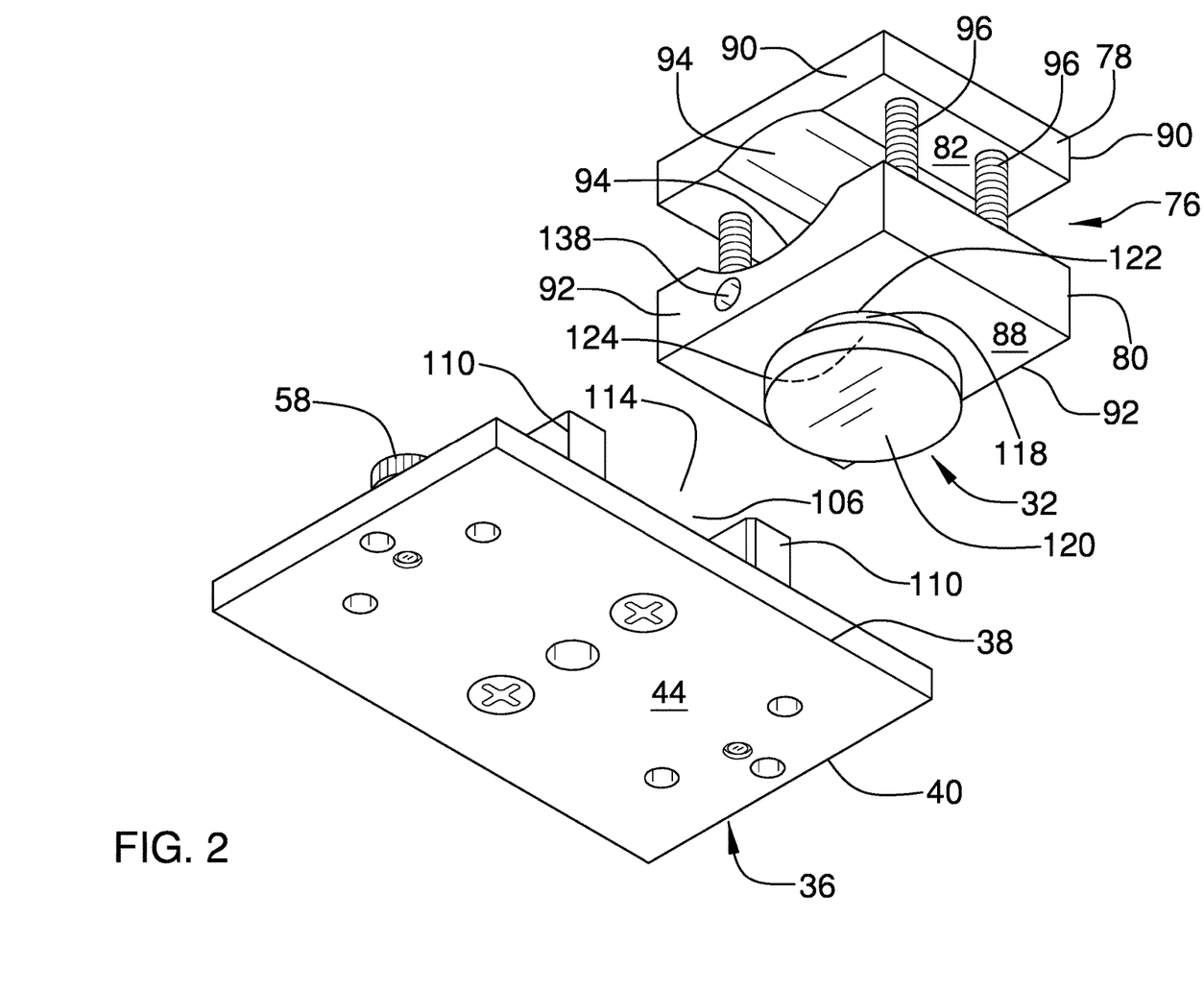
FIG. 2 is a bottom isometric perspective view of an embodiment of the disclosure.
Figure 3:
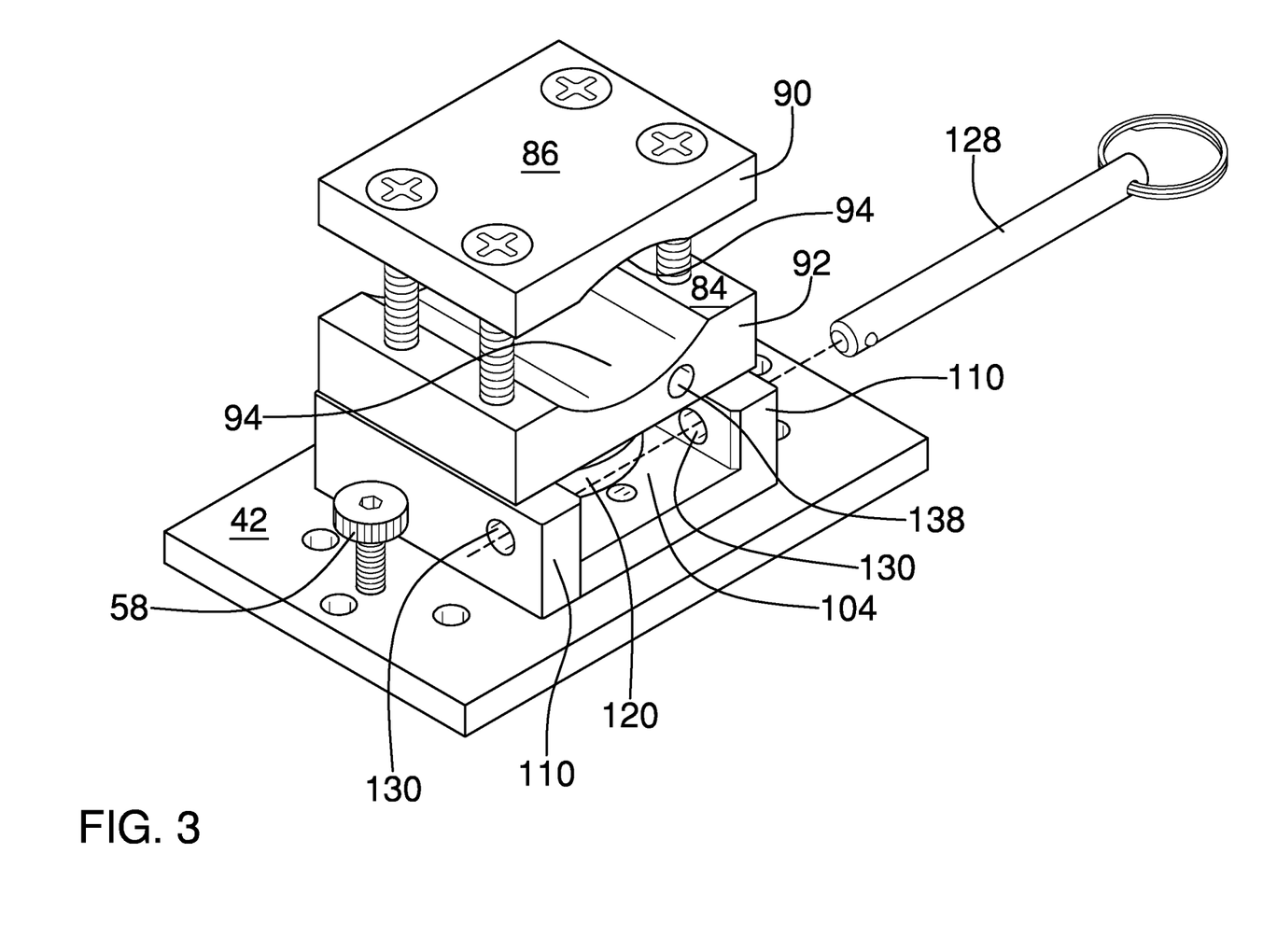
FIG. 3 is an isometric perspective view of an embodiment of the disclosure.

The pole mount 14 generally comprises a clamp 76 although the present invention anticipates the pole mount 14 comprising other mounting means, such as, for example, the second mating member 32 being screwed, welded, or otherwise attached to the pole 20. In one embodiment, the clamp 76 may comprise an upper plate 78 and a lower plate 80, with each of the upper plate 78 and the lower plate 80 having an inward face (82 and 84, respectively), an outward face (86 and 88, respectively), and opposed lateral edges (90 and 92, respectively), as is shown in FIG. 1. The second mating member 32 is attached to the outward face 88 of the lower plate 80, as is shown in FIG. 2. Each of the inward faces 82 and 84 has a depression 94 extending thereinto between the opposed lateral edges 90 and 92 to receive the pole 20. A plurality of clamping fasteners 96 are extendable through one of the upper plate 78 and the lower plate 80 and engage the other of the upper plate 78 and the lower plate 80 to releasably secure the clamp 76 to the pole 20, as is shown in FIG. 4. Typically, the clamping fasteners 96 will comprise bolts 98 that are threadedly insertable into corresponding threaded holes 100, although other fastening means are anticipated as well, such as, but not limited to, fixed bolts and wingnuts, thumbscrews, or the like.

In another embodiment, not shown, the clamp 76 may comprise a solid block with an aperture extending therethrough for receiving the pole 20, wherein a biased detent or screw extending into the aperture would hold the pole 76 in place. The second mating member 32 would be attached to a bottom side of the solid block.

As is shown in FIG. 1, the first mating member 30 comprises a housing 102, which define an interior space 104 and which has a front wall 106, a rear wall 108, and opposed side walls 110 that are attached to the boat mount 12. A top wall 112 of the housing 102 is attached to and extends between the front wall 106, the rear wall 108, and the opposed side walls 110. The front wall 106 has a void 114 positioned therein and the top wall 112 has a slot 116 positioned therein and extending from the void 114 toward the rear wall 108.

As is shown in FIG. 2, the second mating member 32 comprises a post 118 and a pivot disc 120. The post 118 has a first end 122 and a second end 124. The first end 122 is attached to the pole mount 14. The pivot disc 120 is attached to the second end 124 and extends radially from the post 118. The pivot disc 120 is insertable into the interior space 104 through the void 114 concurrently with the post 118 being inserted into the slot 116 to mate the second mating member 32 to the first mating member 30. As is shown in FIGS. 5 and 6, the pivot disc 120 is rotatable within the interior space 104 to selectively position the pole 20 within the horizontal plane 34, thereby allowing the user to rotate the receiving net 28 toward the hull 16.

A securing member 126 releasably secures the pivot disc 120 within the interior space 104. The securing member 126 may comprise a locking pin 128 that extends through apertures 130 positioned in each of the opposed side walls 110 proximate to the front wall 106 such that the locking pin 128 retains the pivot disc 120 in the interior space 104. The present invention anticipates a channel 138 extending into the lower plate 80 and in which the locking pin 128 can be stowed when not in use. Other securing means also are anticipated for securing the pivot disc 120 within the interior space 104, such as, but not limited to, spring loaded pins, latches, or the like.

The present invention also includes a fishing net support system 132, which comprises a boat 18 having a hull 16, a fishing net 22, and a fishing net support assembly 10. The hull 16 has an upper edge 134 that defines a gunwale 52. The fishing net 22 includes a pole 20 having a loop 24 attached to one end 26 and a receiving net 28 attached to and extending along the loop 24. A boat mount 12 and a pole mount 14 of the fishing net support assembly 10 are mounted onto the gunwale 52 and to the pole 20, respectively. A first mating member 30 and a second mating member 32 of the fishing net support assembly 10 are attached to the boat mount 12 and to the pole mount 14, respectively. The second mating member 32 has been mated to the first mating member so that the pole 20 is rotatable about the first mating member 30 in a horizontal plane 34 to selectively position the receiving net 28 relative to the hull 16 of the boat 18.

In use, the user nets a catch and then mates the second mating member 32 to the first mating member 30 to rotatably mount the fishing net 22 to the hull 16, as is described above and as is shown in the figures. As should be understood from the drawings, the fishing net support assembly 10 allows the user to secure the fishing net 22 and a catch to the hull 16 while keeping the catch in the water, which is particularly important in catch and release fishing. The user has their hands free to perform other tasks, such as measuring, weighing, photographing, unhooking, and releasing the catch, which can be facilitated by rotating the receiving net 28 toward the hull 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing net support assembly comprising:
   a boat mount configured to be mounted onto a bull of a boat;
   a first mating member being attached to the boat mount;
   a pole mount configured to be mounted to a pole of a fishing net;
   a second mating member being attached to the pole mount such that upon mating of the second mating member to the first mating member the first mating member in a horizontal plane and configured for maintaining a receiving net of the fishing net and a catch in the receiving net in the water; and
   wherein the boat mount comprises:
      a mounting plate having a length, a width, a top side, and a bottom side, the first mating member being attached to the top side, one or both of the length and the width being complementary to a separation between rails of a mounting track attached to a gunwale of the hull, the mounting plate being insertable between the rails such that the mounting plate is slidable within the mounting track with the bottom side facing the mounting track; and
      a plurality of tighteners being extendable through the mounting plate and engaging the mounting track for releasably securing the mounting plate at a selected position along the mounting track.

2. The fishing net support assembly according to claim 1, wherein the pole mount comprises a clamp.

3. A fishing net support assembly comprising:
   a boat mount configured to be mounted onto a hull of a boat;
   a first mating member being attached to the boat mount;
   a pole mount configured to be mounted to a pole of a fishing net;
   a second mating member being attached to the pole mount such that upon mating of the second mating member to the first mating member the first mating member in a horizontal plane and configured for maintaining a receiving net of the fishing net and a catch in the receiving net in the water; and
   wherein the boat mount comprises:
      a bracket having a horizontal piece and a vertical piece, the horizontal piece having an upper face and a lower face, the first mating member being attached to the upper face, the vertical piece having an inner face and an outer face; and
      a plurality of mounting fasteners being extendable through the vertical piece and engaging the hull such that the inner face faces the hull.

4. A fishing net support assembly comprising:
   a boat mount configured to be mounted onto a hull of a boat;
   a first mating member being attached to the boat mount;
   a pole mount configured to be mounted to a pole of a fishing net;
   a second mating member being attached to the pole mount such that upon mating of the second mating member to the first mating member the first mating member in a horizontal plane and configured for maintaining a receiving net of the fishing net and a catch in the receiving net in the water; and
   wherein the clamp comprises:
      an upper plate and a lower plate, each of the upper plate and the lower plate having an inward face, an outward face, and opposed lateral edges the second mating member being attached to the outward face of the lower plate, each of the inward faces having a depression extending thereinto between the opposed lateral edges for receiving the pole; and
      a plurality of clamping fasteners being extendable through one of the upper plate and the lower plate and engaging the other of the upper plate and the lower plate for releasably securing the clamp to the pole.

5. A fishing net support assembly comprising:
   a boat mount configured to be mounted onto a hull of a boat;
   a first mating member being attached to the boat mount;
   a pole mount configured to be mounted to a pole of a fishing net;
   a second mating member being attached to the pole mount such that upon mating of the second mating member to the first mating member the first mating member in a horizontal plane and configured for maintaining a receiving net of the fishing net and a catch in the receiving net in the water; and wherein the first mating member comprises a housing defining an interior space and having a front wall, a rear wall, and opposed side walls being attached to the boat mount, a top wall of the housing being attached to and extending between the front wall, the rear wall, and the opposed side walls, the front wall having a void positioned therein, the top wall having a slot positioned therein extending from the void toward the rear wall; and wherein the second mating member comprises:
a post having a first end and a second end, the first end being attached to the pole mount; and
a pivot disc being attached to the second end and extending radially from the post such that the pivot disc is insertable into the interior space through the void concurrently with the post being inserted into the slot for mating the second mating member to the first mating member, the pivot disc being rotatable within the interior space for selectively positioning the pole within the horizontal plane.

6. The fishing net support assembly according to claim 5, further including a securing member releasably securing the pivot disc within the interior space.

7. The fishing net support assembly according to claim 6, wherein the securing member comprises a locking pin extending through apertures positioned in each of the opposed side walls proximate to the front wall such that the locking pin retains the pivot disc in the interior space.

8. A fishing net support system comprising:
a boat having a hull, the hull having an upper edge defining a gunwale;
a fishing net including a pole and a loop attached to one end of the pole, a receiving net being attached to and extending along the loop;
a boat mount being mounted onto the gunwale;
a first mating member being attached to the boat mount;
a pole mount being attached to the pole;
a second mating member being attached to the pole mount and mated to the first mating member such that the pole is rotatable about the first mating member in a horizontal plane while maintaining the receiving net and a catch in the receiving net in the water;
a mounting track being attached to the gunwale, the mounting track comprising a pair of rails; and
the boat mount comprising:
a mounting plate having a length, a width, a top side, and a bottom side, the first mating member being attached to the top side, one or both of the length and the width being complementary to a separation between the rails of the pair of rails, the mounting plate being inserted between the rails and slid within the mounting track to a selected position along the mounting track with the bottom side facing the mounting track; and
a plurality of tighteners being extended through the mounting plate and engaged to the mounting track such that the mounting plate is releasably secured at the selected position.

9. The fishing net support system according to claim 8, wherein the pole mount comprises a clamp.

10. A fishing net support system comprising:
a boat having a hull, the hull having an upper edge defining a gunwale;
a fishing net including a pole and a loop attached to one end of the pole, a receiving net being attached to and extending along the loop;
a boat mount being mounted onto the gunwale;
a first mating member being attached to the boat mount;
a pole mount being attached to the pole;
a second mating member being attached to the pole mount and mated to the first mating member such that the pole is rotatable about the first mating member in a horizontal plane while maintaining the receiving net and a catch in the receiving net in the water; and wherein the boat mount comprises:
a bracket having a horizontal piece and a vertical piece, the horizontal piece having an upper face and a lower face, the first mating member being attached to the upper face, the vertical piece having an inner face and an outer face; and
a plurality of mounting fasteners being extended through the vertical piece and engaged to the hull such that the inner face faces the hull.

11. A fishing net support system comprising:
a boat having a hull, the hull having an upper edge defining a gunwale;
a fishing net including a pole and a loop attached to one end of the pole, a receiving net being attached to and extending along the loop;
a boat mount being mounted onto the gunwale;
a first mating member being attached to the boat mount;
a pole mount being attached to the pole;
a second mating member being attached to the pole mount and mated to the first mating member such that the pole is rotatable about the first mating member in a horizontal plane while maintaining the receiving net and a catch in the receiving net in the water; and wherein the clamp comprises:
an upper plate and a lower plate, each of the upper plate and the lower plate having an inward face, an outward face, and opposed lateral edges the second mating member being attached to the outward face of the lower plate, each of the inward faces having a depression extending thereinto between the opposed lateral edges, the pole being positioned in the depressions; and
a plurality of clamping fasteners being extended through one of the upper plate and the lower plate and engaged to the other of the upper plate and the lower plate such that the clamp is releasably secured to the pole.

12. A fishing net support system comprising:
a boat having a hull, the hull having an upper edge defining a gunwale;
a fishing net including a pole and a loop attached to one end of the pole, a receiving net being attached to and extending along the loop;
a boat mount being mounted onto the gunwale;
a first mating member being attached to the boat mount;
a pole mount being attached to the pole;
a second mating member being attached to the pole mount and mated to the first mating member such that the pole is rotatable about the first mating member in a horizontal plane while maintaining the receiving net and a catch in the receiving net in the water;
wherein the first mating member comprises a housing defining an interior space and having a front wall, a rear wall, and opposed side walls being attached to the boat mount, a top wall of the housing being attached to and extending between the front wall, the rear wall, and the opposed side walls, the front wall having a void positioned therein, the top wall having a slot positioned therein extending from the void toward the rear wall; and wherein the second mating member comprises:
- a post having a first end and a second end, the first end being attached to the pole mount; and
- a pivot disc being attached to the second end and extending radially from the post, the pivot disc being inserted into the interior space through the void and the post being inserted into the slot, such that the second mating member is mated to the first mating member, the pivot disc being rotatable within the interior space for selectively positioning the pole within the horizontal plane.

13. The fishing net support system according to claim 12, further including a securing member releasably securing the pivot disc within the interior space.

14. The fishing net support system according to claim 13, wherein the securing member comprises a locking pin extending through apertures positioned in each of the opposed side walls proximate to the front wall such that the locking pin retains the pivot disc in the interior space.

\* \* \* \* \*